United States Patent
Alexander et al.

(10) Patent No.: US 7,747,506 B2
(45) Date of Patent: Jun. 29, 2010

(54) RECIPIENT STATUS INDICATOR SYSTEM AND METHOD

(75) Inventors: Keith Alexander, Sandy Hook, CT (US); Paul Buu, Seymour, CT (US); Edward N. Flynn, Newtown, CT (US); Roberta Gail, Beltsville, MD (US); David Gallucci, Hamden, CT (US); Jay Thompson, Great Falls, VA (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1579 days.

(21) Appl. No.: 10/301,806

(22) Filed: Nov. 21, 2002

(65) Prior Publication Data

US 2003/0229575 A1 Dec. 11, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2006.01)

(52) U.S. Cl. ..................... 705/37; 370/395.4

(58) Field of Classification Search ............ 705/37
See application file for complete search history.

(56) References Cited

U.S. PATENT DOCUMENTS

| | | | |
|---|---|---|---|
| 5,812,988 | A | 9/1998 | Sandretto |
| 6,442,533 | B1 | 8/2002 | Hinkle |
| 6,615,383 | B1 * | 9/2003 | Talluri et al. ............ 714/749 |
| 7,167,844 | B1 | 1/2007 | Leong et al. |
| 2001/0034686 | A1 | 10/2001 | Eder |
| 2002/0156716 | A1 | 10/2002 | Adatia |
| 2003/0083973 | A1 | 5/2003 | Horsfall |
| 2003/0118031 | A1 * | 6/2003 | Classon et al. ......... 370/395.54 |
| 2004/0034591 | A1 | 2/2004 | Waelbroeck et al. |

OTHER PUBLICATIONS

Siemens (Siemens Adds 50 MBaud Receiver to Data Link Family, News Release, p. 1 Jan. 22, 1990).*

* cited by examiner

*Primary Examiner*—Ojo O Oyebisi
(74) *Attorney, Agent, or Firm*—Fish & Richardson P.C.

(57) ABSTRACT

An indicator signal monitoring process receives the sequential transmission of an indicator signal that is repeatedly broadcast by a primary intended recipient of attributable security interest messages. A recipient offline determination process determines that the primary intended recipient is offline whenever the indicator signal is not received for a defined failure period.

38 Claims, 5 Drawing Sheets

RECIPIENT STATUS INDICATOR SYSTEM AND METHOD

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002

BACKGROUND

This invention relates to electronic-based securities trading, and more particularly to processing and displaying of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a recipient status indicator system includes a message transmission process, which is executed by a broadcast server and transmits attributable security interest messages over a network to a primary intended recipient and one or more backup intended recipients. An indicator signal transmission process, which is executed by the primary intended recipient, repeatedly and sequentially broadcasts an indicator signal over the network. An indicator signal monitoring process receives, from the network, the indicator signal broadcast by the indicator signal transmission process. A recipient offline determination process determines that the primary intended recipient is offline whenever the indicator signal is not received for a defined failure period.

One or more of the following features may also be included. This defined failure period may be a defined period of time or a defined number of non-received indicator signals.

The message transmission process includes a message repository process for storing the attributable security interest messages transmitted during a defined transmission period, such as a trading day.

The message transmission process includes a message cataloging process for organizing and assigning a unique identifier to each of the attributable security interest messages stored by the message repository process. A message redirection process, which is responsive to the recipient offline determination process determining that the primary intended recipient is offline, effectuates the redirection of future attributable security interest messages from the primary intended recipient to a backup intended recipient. The message transmission process transmits all future attributable security interest messages to the backup intended recipient.

A backup indicator signal transmission process, which is executed by the backup intended recipient and is responsive to the message redirection process effectuating the redirection of future attributable security interest messages, repeatedly and sequentially broadcasts a backup indicator signal over the network. The indicator signal monitoring process is configured to receive, from the network, the backup indicator signal broadcast by the backup indicator signal transmission process.

A reconciliation process, which is responsive to the message redirection process effectuating the redirection of future attributable security interest messages, determines which of the attributable security interest messages transmitted by the message transmission process were received by the backup intended recipient. This reconciliation process effectuates the retransmission of those messages that were never received by the backup intended recipient.

The above-described recipient status indicator system may also be interconnected with a data bus, as opposed to a network. Further, the above-described processes may also be implemented as a method or a sequence of instructions executed by a processor.

One or more advantages can be provided from the above. The status of the primary intended recipient can be monitored. In the event of a failure, message transmission can be automatically redirected to a backup intended recipient. By storing and uniquely identifying each transmitted message, the process of updating the backup intended recipient is automated and simplified. As multiple backup intended recipients can be used, redundancy can be enhanced.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
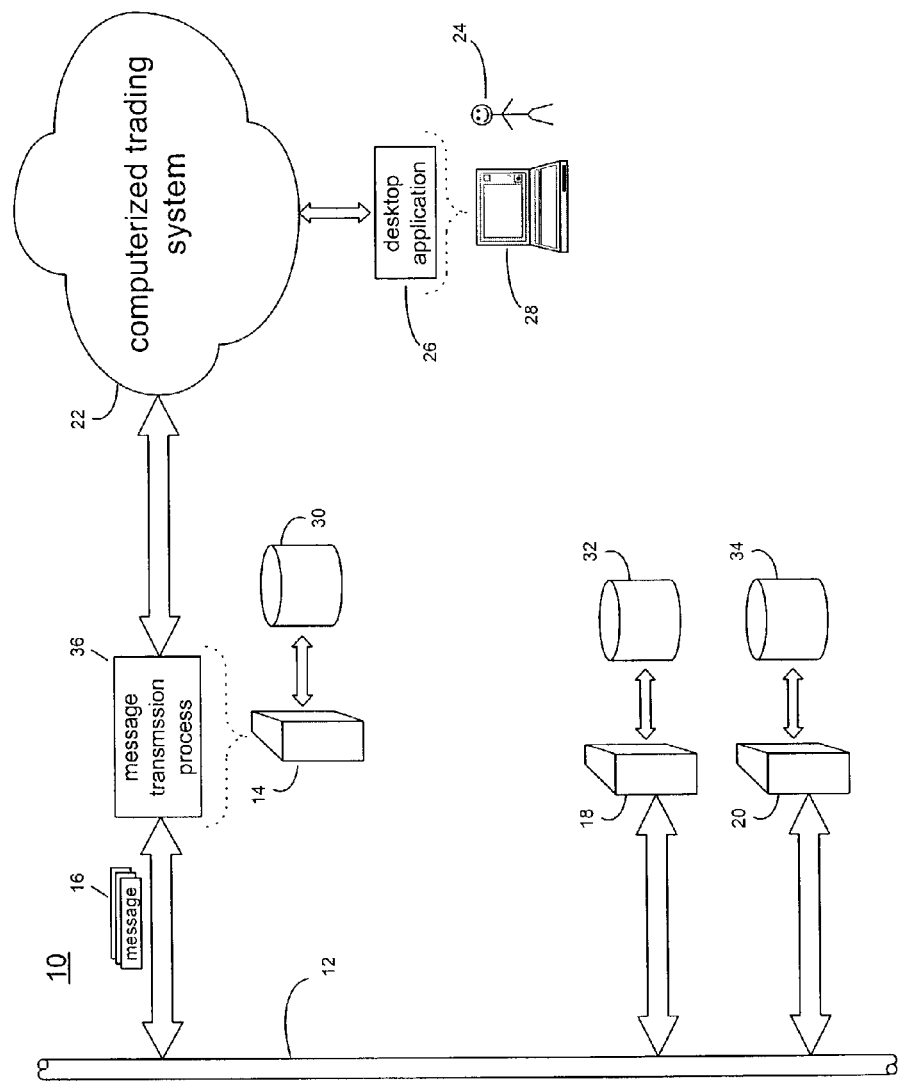
FIG. 1 is a block diagram of a network including a broadcast server, a primary intended recipient, and a backup intended recipient.

Referring to FIG. 1, there is shown a recipient status indicator system 10 that is distributed across and operates on several devices connected to network 12.

A broadcast server 14 is connected to a network 12 (e.g., the Internet, an intranet, a local area network, some other form of network, etc.). Broadcast server 14 transmits attributable security interest messages (e.g., messages 16) across network 12 to one or more intended recipients 18, 20. One of these intended recipients is designated the primary intended recipient (e.g., recipient 18) and the other is designated the backup intended recipient (e.g., recipient 20). Recipients 18, 20 are typically NT-class servers (i.e., a server running Microsoft Windows NT server™) that are used for downstream publishing of messages 16 to users/subscribers (not shown). Broadcast server 14, which may also be an NT-class server, receives attributable security interest messages 16 from computerized trading system 22.

Computerized trading system 22, which trades securities electronically, processes trades (which are in the form of messages 16) entered by various market participants (e.g., market participant 24). Market participant 24 typically accesses and uses computerized trading system 22 through a desktop application 26 (e.g., Microsoft Internet Explorer™, Netscape Navigator™, the Nasdaq Workstation II™, a specialized desktop interface) running on computer 28, thus allowing market participant 24 to trade securities with other market participants (not shown). Broadcast server 14, primary intended recipient 18, and backup intended recipient 20 each include a storage device 30, 32, and 34 respectively. These storage devices 30, 32, and 34 are used to store messages 16 and the individual instruction sets and subroutines of recipient status indicator system 10 (to be discussed below in greater detail). Storage devices 30, 32, and 34 may be hard disk drives, tape drives, optical drives, RAID arrays, random access memories (RAM), or read-only memories (ROM), for example. Broadcast server 14, primary intended recipient 18, and backup intended recipient 20 each include at least one central processing unit (not shown) and main memory system (not shown). Broadcast server 14 executes a message transmission process 36 that transmits messages 16 to recipients 18, 20 using network 12.

Figure 2:
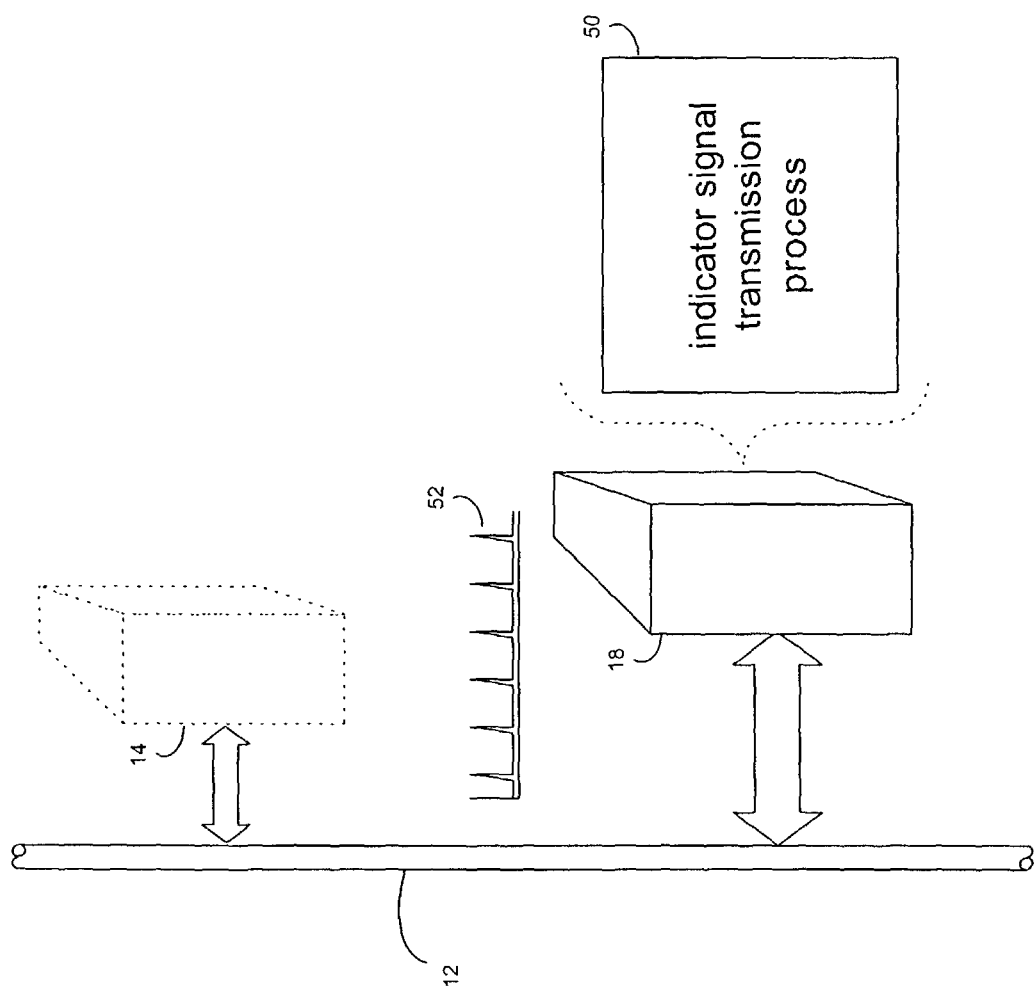
FIG. 2 is a block diagram of a primary intended recipient including portions of a recipient status indicator process.

Referring to FIG. 2, recipient status indicator system 10 (FIG. 1) includes an indicator signal transmission process 50 that is executed by the primary intended recipient 18. Indicator signal transmission process 50 repeatedly and sequentially broadcasts a primary indicator signal 52 over the network 12. This primary indicator signal 52 includes an identifier that identifies the transmitter, which in this case is the primary intended recipient 18. The use of an identifier allows for the differentiation of indicator signals amongst other broadcasters that are attached to the same network.

As long as primary intended recipient 18 is up and running, indicator signal transmission process 50 continues to transmit primary indicator signal 52. However, if primary intended recipient 18 exhibits a failure, primary indicator signal 52 will no longer be transmitted. Therefore, the presence of primary indicator signal 52 on network 12 is indicative of primary intended recipient 18 being present on the network and operating properly. Further, in the event of a network failure between broadcast server 14 and primary intended recipient 18, primary indicator signal 52 will no longer be present across network 12.

Figure 3:
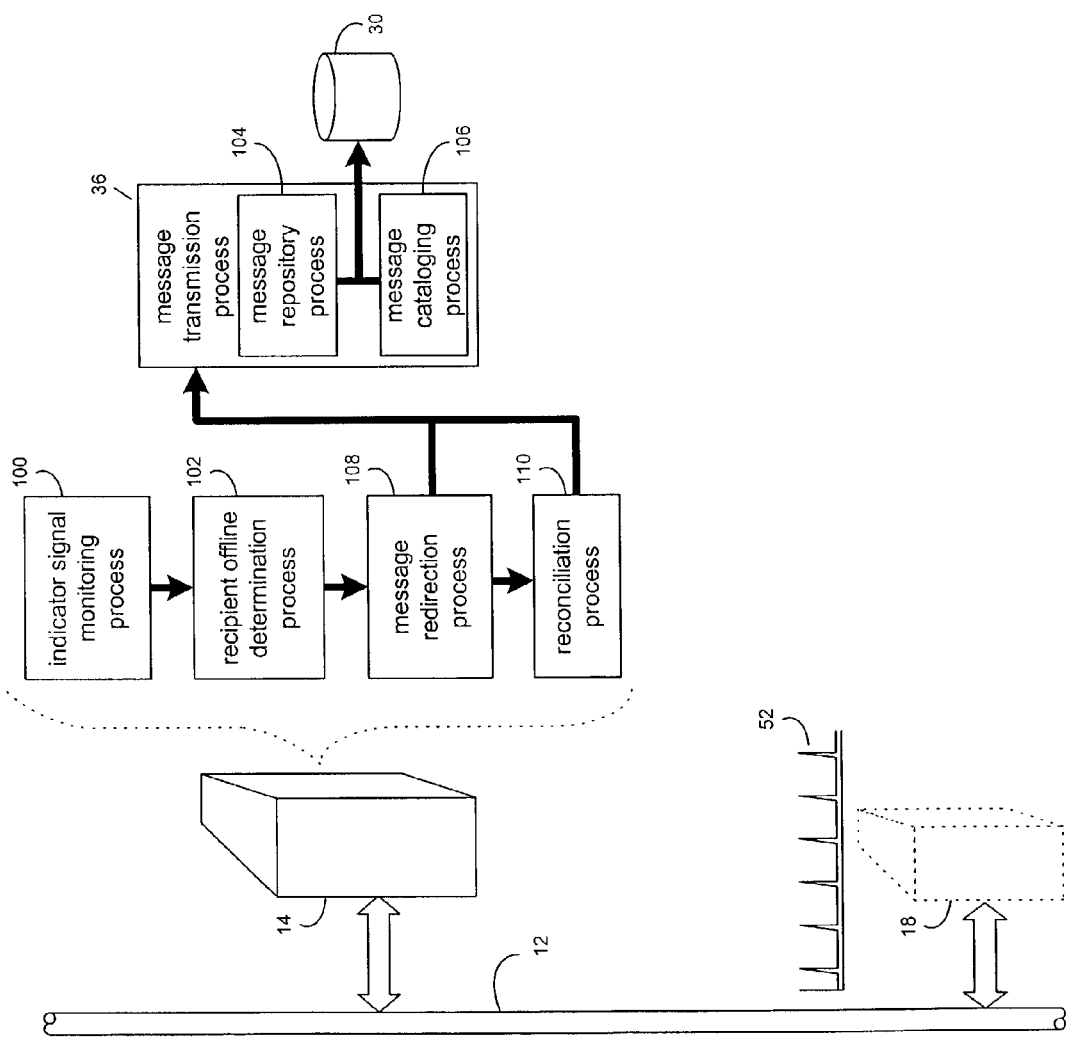
FIG. 3 is a block diagram of a broadcast server including portions of a recipient status indicator process.

Referring to FIG. 3, recipient status indicator system 10 (FIG. 1) includes an indicator signal monitoring process 100 that is executed by the broadcast server 14. Indicator signal monitoring process 100 monitors signals broadcast across network 12 to determine whether indicator signal 52, as transmitted by the primary intended recipient 18, is present. As stated above, since the primary intended recipient 18 is designed to broadcast primary indicator signal 52 continuously, if signal 52 is not received by indicator signal monitoring process 100, this is indicative of a communication failure between broadcast server 14 and primary intended recipient 18, or a failure of primary intended recipient 18.

Information concerning whether primary indicator signal 52 is received by indicator signal monitoring process 100 is provided to recipient offline determination process 102. Recipient offline determination process 102 examines the periodicity of the signal being received by indicator signal monitoring process 100 to determine whether primary intend recipient 18 is offline.

For example, the primary intended recipient 18 is configured so that the primary indicator signal 52 is repeatedly and sequentially transmitted. For example, the primary indicator signal 52 may be broadcast every fifty milliseconds.

As certain network topologies, such as Ethernet, allow for collisions of data packets to occur (with subsequent rebroadcasts of those data packets that collided), it is possible for primary indicator signal 52 to arrive later than would be expected. Further, in heavy network traffic conditions, it is possible for primary indicator signal 52 not to arrive at all. Therefore, in the event that one cycle of primary indicator signal 52 is not received, this may not necessarily indicate that primary intended recipient 18 of offline.

Accordingly, the recipient offline determination process 102 deems the primary intended recipient to be offline if primary indicator signal 52 is not received for a defined failure period. This defined failure period may be designated as a defined period of time (e.g., five-hundred milliseconds) or a defined number of non-received indicator signals (e.g., ten consecutive signals not received). Further, there may be different failure levels associated with varying percentages of the failure period. For example, a "condition green" may indicate that the primary intended recipient is functioning properly and may be defined as not more than three consecutive primary indicator signals being non-received. A "condition yellow" may indicate a possible problem with primary intended recipient 18, in that between three and nine consecutive primary indicator signals were not received. Further, a "condition red" may indicate a failure of primary intended recipient 18, in that ten or more consecutive primary indicator signals were not received.

Message transmission process 36 includes a message cataloging process 104 that works in conjunction with a message repository process 106. As message transmission process 36 transmits messages 16 to recipients 18, 20, message cataloging process 106 assigns a unique identifier to each of these messages prior to transmission. Examples of this unique identifier are sequential numbers, a transmission time stamp (i.e., the time the message was transmitted by the broadcast server 14), and a receipt time stamp (i.e., the time the message was received by the broadcast server 16). These "uniquely-identified" messages are stored on storage device 30 by message repository process 104.

While these messages are typically stored for a defined transmission period (such as a trading day with respect to computerized trading system 22), it is foreseeable that storage device 30 may provide full archival storage of transmitted messages.

In the event that recipient offline determination process 102 determines that primary intended recipient 18 is offline, a message redirection process 108 redirects the transmission of any future messages 16 from the primary intended recipient 18 to the backup intended recipient 20 (FIG. 1). This redirection typically occurs by message redirection process 108 changing the recipient address of the messages 16 that message transmission process 36 is transmitting. Typically, each recipient has a unique address, such as an Internet protocol (IP) address.

As stated above, the primary and backup intended recipients are typically servers that provide downstream publishing services for messages 16. This downstream publishing may include message streaming and query-based message retrieval. Therefore, for query-based message retrieval, the messages received by the intended recipient should be up-to-date and complete with respect to the messages transmitted during the defined transmission period (e.g., a trading day on the computerized trading system). Accordingly, once message transmission is redirected from the primary intended recipient to the backup intended recipient, the backup intended recipient 20 (FIG. 1) is polled to determine what, if any, messages it has not received. For example, if messages were being transmitted to the backup intended recipient concurrently with the primary intended recipient, the messages received by the backup intended recipient should be complete and up-to-date. However, if messages 16 were only being transmitted to the primary intended recipient 18, the backup intended recipient (which is now receiving the messages transmitted by message transmission process 36) would not have received any messages prior to the message redirection by message redirection process 108. Therefore, reconciliation process 110 will poll the backup intended recipient 20 (FIG. 1) to determine which messages the primary intended recipient is missing.

As stated above, each message transmitted by message transmission process 36 is assigned a unique identifier prior to it being transmitted. Further, these transmitted messages are stored on storage device 30 for a defined transmission period. For example, assume that at the beginning of the defined transmission period, the unique identifier is reset to zero (i.e., "000000") and primary intended recipient 18 fails while message "002000" is being transmitted. Message redirection process 108 redirects all future messages (i.e., message "002001" and greater) to the backup intended recipient 20 (FIG. 1), and reconciliation process 110 polls the backup intended recipient 20 (FIG. 1) to determine which, if any, messages need to be retransmitted.

Reconciliation process 110 will contact backup intended recipient 20 (FIG. 1) and inquire as to the first message that it received. The backup intended recipient will reply that the first message that it received was message "002001". Reconciliation process, knowing that the first message transmitted was actually message "000000" instructs message transmission process 36 to retransmit messages "000000" through "002000" to the backup intended recipient. Once this retransmission is complete, the backup intended recipient has the complete set of the messages that were broadcast during the defined transmission period.

As stated above, once it is determined that the primary intended recipient 18 is offline, all future messages 16 will be transmitted to the backup intended recipient 20 (See FIG. 1).

Figure 4:
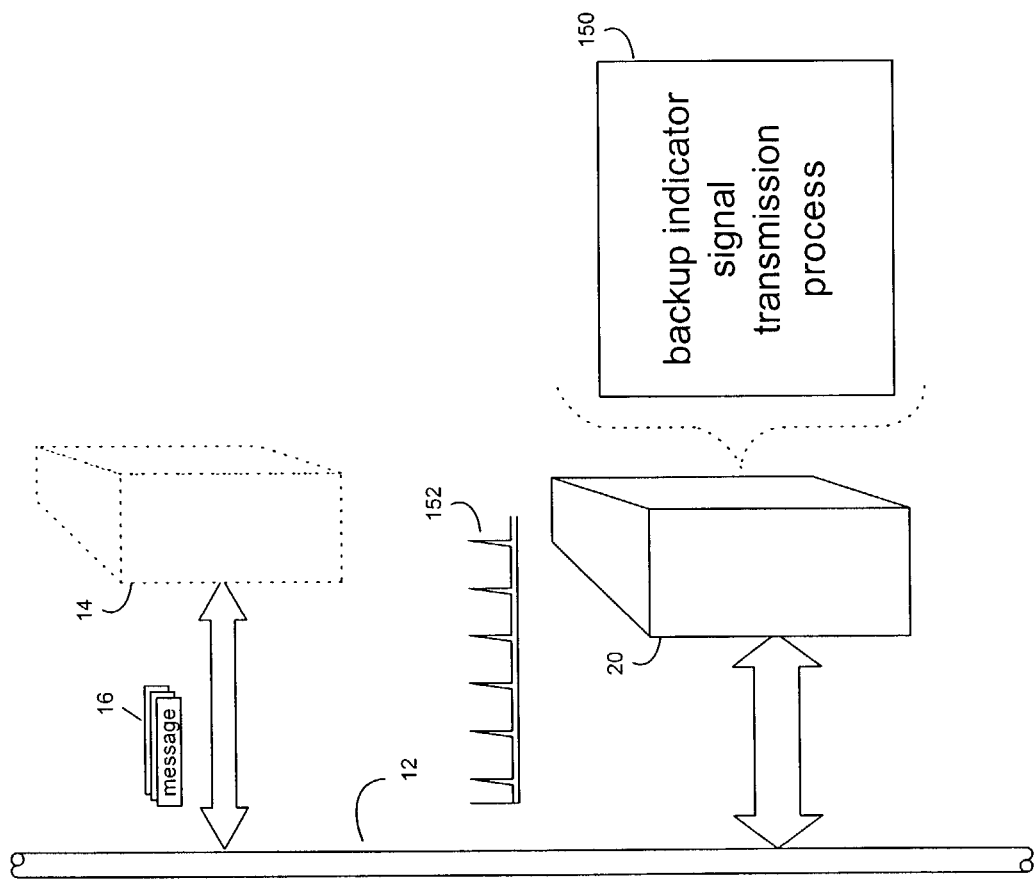
FIG. 4 is a block diagram of a backup intended recipient including portions of a recipient status indicator process.

Referring to FIG. 4, backup intended recipient 20 includes a backup indicator signal transmission process 150. Once it is determined that the primary intended recipient is offline and all future messages 16 are redirected to backup intended recipient 20, backup indicator signal transmission process 150 repeatedly and sequentially broadcasts a backup indicator signal 152 across network 12. As with the primary indicator signal 52 (See FIG. 3), the backup indicator signal transmission process 150 repeatedly and sequentially broadcasts the backup indicator signal 152 across the network 12. This backup indicator signal 152 also typically includes an identifier that identifies the transmitter, which in this case is the backup intended recipient 20.

As long as the backup intended recipient 20 is up and running, backup indicator signal transmission process 150 continues to transmit backup indicator signal 152. However, if the backup intended recipient 20 exhibits a failure, backup indicator signal 152 will no longer be transmitted. Therefore, the presence of backup indicator signal 152 on network 12 is indicative of the backup intended recipient 20 operating properly and being present on the network.

While the broadcast server, primary intended recipient, and backup intended recipient(s) are described above as being interconnected with a network, other implementations are possible. For example, these devices may be interconnected with a data bus, and the devices themselves may be portions of a multiprocessing, fault-tolerant server. Therefore, individual central processing units within the multi-processing, fault-tolerant server may perform the functions of the broadcast server, primary intended recipient, and backup intended recipient(s), and these central processing units may all be interconnected with a data bus.

While only one backup intended recipient 20 is shown, multiple backup intended recipients may be used to enhance redundancy. Therefore, in the event of a failure of the first backup intended recipient, all future messages could be redirected to a subsequent backup intend recipient.

While broadcast server 14 is described as transmitting messages 16 to both primary and backup intended recipients, other configurations are possible. For example, broadcast server 14 may broadcast to only the primary intended recipient 18 and, in the event of a failure of primary intended recipient 18, the messages 16 may then be broadcast to the backup intended recipient 20.

While message repository process 104 and message cataloging process 106 are described above as storing and organizing messages 16 as they are transmitted, other configurations are possible. For example, these messages 16 may be stored and organized when they are first received by broadcast server 14.

Figure 5:
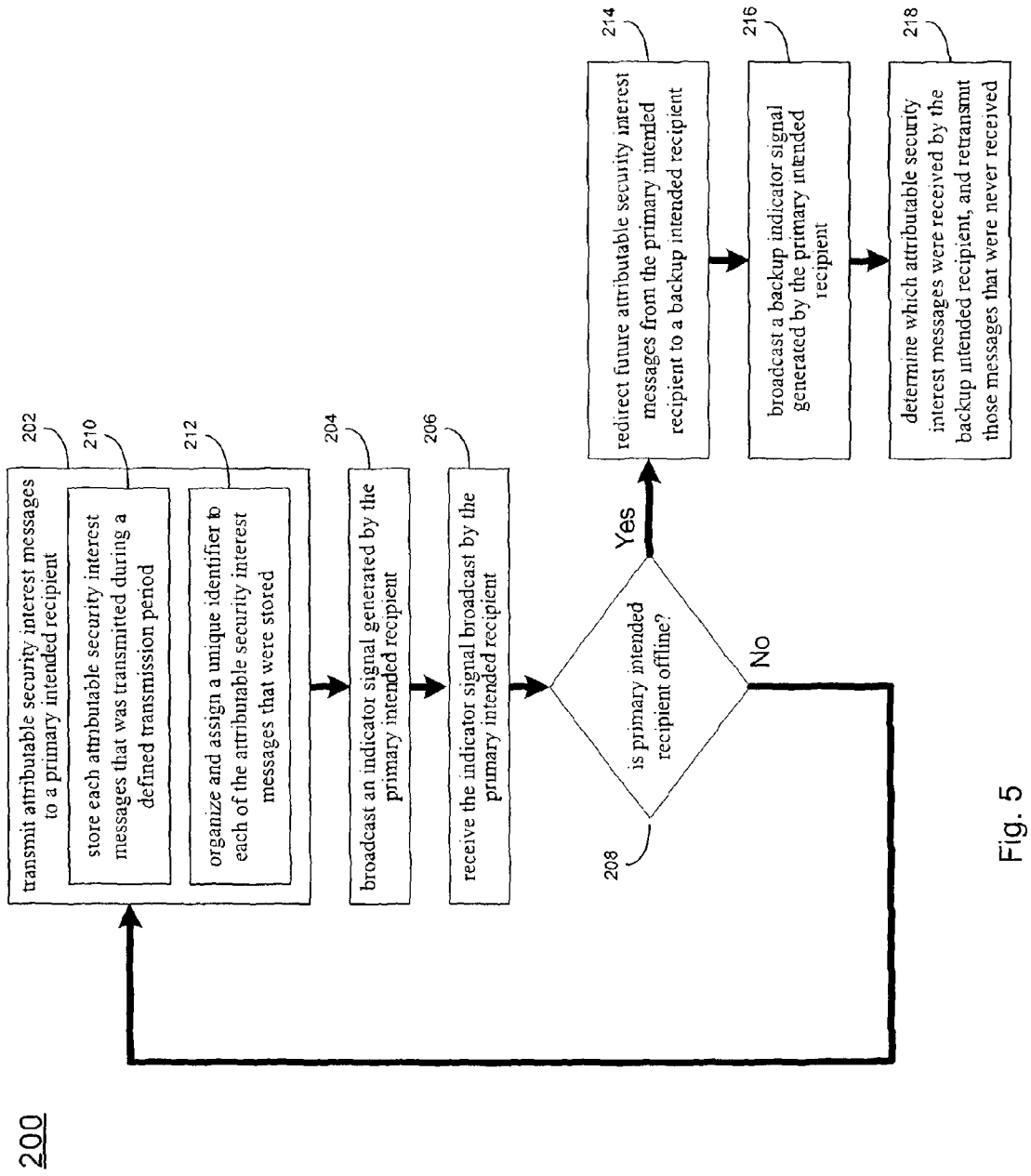
FIG. 5 is a flow chart of a recipient status indicator method.

Referring to FIG. 5, a recipient status indicator method 200 is shown. Attributable security interest messages are transmitted 202, over a network, to a primary intended recipient. An indicator signal, which is generated by the primary intended recipient, is repeatedly and sequentially broadcast 204 over the network. This indicator signal, which is broadcast by the primary intended recipient, is received 206 from the network. Whenever the indicator signal is not received for a defined failure period, a determination 208 is made that the primary intended recipient is offline. This defined failure period may be a defined period of time or a defined number of non-received indicator signals.

Transmitting attributable security interest messages 202 includes storing 210 the attributable security interest messages transmitted during a defined transmission period (e.g., a trading day), and organizing and assigning 212 a unique identifier to each of the attributable security interest messages that were stored.

The redirection of future attributable security interest messages from the primary intended recipient to a backup intended recipient is effectuated 214 if it is determined that the primary intended recipient is offline. If the future attributable security interest messages are redirected to the backup intended recipient, a backup indicator signal is repeatedly and sequentially broadcast 216 over the network.

A determination 218 is made concerning which of the transmitted attributable security interest messages were received by the backup intended recipient, such that those messages that were not received are retransmitted to the backup intended recipient.

The recipient status indicator system described herein is not limited to the embodiment described above; it may find applicability in any computing or processing environment. The recipient status indicator system may be implemented in hardware, software, or a combination of the two. For example, the recipient status indicator system may be implemented using circuitry, such as one or more of programmable logic (e.g., an ASIC), logic gates, a processor, and a memory.

The recipient status indicator system may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the recipient status indicator system. The recipient status indicator system may also be implemented as a machine-readable storage medium, configured with a computer program, where, upon execution, instructions in the computer program cause a machine to operate to perform the functions of the recipient status indicator system described above.

Embodiments of the recipient status indicator system may be used in a variety of applications. Although the recipient status indicator system is not limited in this respect, the recipient status indicator system may be implemented with memory devices in microcontrollers, general purpose microprocessors, digital signal processors (DSPs), reduced instruction-set computing (RISC), and complex instruction-set computing (CISC), among other electronic components.

Embodiments of the recipient status indicator system may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A system comprising:
a broadcast server including:
    a processing device;
    main memory coupled to the processing device; and
a computer readable medium storing a computer program product, the computer program product comprising instructions to cause the processing device of the broadcast server to:
    receive a sequential transmission of an indicator signal that is repeatedly broadcast by a primary intended recipient system independently of receipt of attributable security interest messages, the indicator signal comprising an identification of the primary intended recipient system that is broadcasting the signal; and
    determine that the primary intended recipient system is offline whenever the indicator signal is not received from the primary intended recipient system for a defined failure period.

2. The system of claim 1 wherein the defined failure period is a defined period of time.

3. The system of claim 1 wherein the defined failure period is a defined number of non-received indicator signals.

4. The system of claim 1 further comprising instructions to cause the processing device of the broadcast server to:
    redirect subsequent attributable security interest messages from the primary intended recipient system to a backup intended recipient system in response to a determination that the primary intended recipient system is offline.

5. The system of claim 4 further comprising instructions to cause the processing device of the broadcast server to:
    retransmit any messages that were not received by the backup intended recipient system in response to the redirection of subsequent attributable security interest messages to the backup intended recipient system.

6. A system comprising:
a first computer readable medium storing a first computer program product, the first computer program product comprising instructions to cause a first system at a broadcast server to:
    transmit attributable security interest messages over a network from the broadcast server to a primary intended recipient; and
a second computer readable medium storing a second computer program product, the second computer program product comprising instructions to cause a second system at the primary intended recipient to:
    repeatedly and sequentially broadcast an indicator signal over the network, the indicator signal comprising an identification of the primary intended recipient that is broadcasting the signal; and
    cause the second system to broadcast the indicator signal independently of the receipt of the attributable security interest messages;
wherein the first computer program product further comprises instructions to cause the first system to:
    receive, from the network, the indicator signal broadcast by the second system; and
    determine that the primary intended recipient is offline whenever the indicator signal is not received from the second system for a defined failure period.

7. The system of claim 6 wherein the defined failure period is a defined period of time.

8. The system of claim 6 wherein the defined failure period is a defined number of non-received indicator signals.

9. The system of claim 6, the first computer program product further comprising instructions to cause the first system to:
    store the attributable security interest messages transmitted during a defined transmission period.

10. The system of claim 9 wherein the defined transmission period is a trading day.

11. The system of claim 10, the first computer program product further comprising instructions to cause the first system to:
    organize and assign a unique identifier to each of the stored attributable security interest messages.

12. The system of claim 6, the first computer program product further comprising instructions to cause the first system to:
    redirect and transmit subsequent attributable security interest messages from the primary intended recipient to a backup intended recipient in response to a determination that the primary intended recipient is offline.

13. The system of claim 12 further comprising a third computer readable medium storing a third computer program product, the third computer program product comprising instructions to cause a third system at the backup intended recipient to:
    repeatedly and sequentially broadcast a backup indicator signal over the network in response to a redirection of subsequent attributable security interest messages, the backup indicator signal comprising an identification of the backup intended recipient that is broadcasting the signal, wherein the third computer program product is configured to cause the third system to broadcast the backup indicator signal independently of the receipt of the attributable security interest messages.

14. The system of claim 12 further comprising instructions to cause the first system to:
    determine, in response to the redirection of the subsequent attributable security interest messages, which of the attributable security interest messages transmitted by the message transmission process were received by the backup intended recipient; and
    retransmit those messages that were never received by the backup intended recipient.

15. A system comprising:

a broadcast server configured to:

transmit attributable security interest messages over a network to a primary intended recipient system and one or more backup intended recipient systems;

receive a primary indicator signal broadcast by the primary intended recipient; and determine that the primary intended recipient system is offline whenever the primary indicator signal is not received from the first processing device of the primary intended recipient system for a defined failure period; and at the primary intended recipient system, a computer readable medium storing a first computer program product, the first computer program product comprising instructions to cause a first processing device of the primary intended recipient system to repeatedly and sequentially broadcast the primary indicator signal over the network independently of receipt of attributable security interest messages, the primary indicator signal comprising an identification of the primary intended recipient system having the first processing device that is broadcasting the signal.

16. The system of claim 15 wherein the broadcast server stores the attributable security interest messages transmitted during a defined transmission period.

17. The system of claim 16 wherein the broadcast server organizes and assigns a unique identifier to each of the attributable security interest messages stored.

18. The system of claim 15 wherein the broadcast server:

redirects, in response to a determination that the primary intended recipient system is offline, subsequent attributable security interest messages from the primary intended recipient system to a selected backup recipient system chosen from the one or more backup intended recipient systems; and transmits subsequent attributable security interest messages to the selected backup recipient system.

19. The system of claim 18 further comprising a second computer readable medium storing a second computer program product, the second computer program product comprising instructions to cause a second processing device at the selected backup recipient to:

repeatedly and sequentially broadcast a backup indicator signal over the network in response to a determination that the primary intended recipient system is offline independently of a receipt of the attributable security interest messages, the backup indicator signal comprising an identification of the backup intended recipient system that is broadcasting the signal;

wherein the broadcast server is configured to receive, from the network, the backup indicator signal broadcast by the backup recipient system.

20. The system of claim 18 further comprising instructions for causing the second system to:

determine, in response to the redirection of subsequent attributable security interest messages to the backup intended recipient system, which of the transmitted attributable security interest messages were received by the selected backup recipient system; and retransmit those messages that were never received by the selected backup recipient system.

21. A system comprising:

a data bus;

a broadcast server, connected to the data bus, configured to transmit attributable security interest messages over the data bus to a primary intended recipient system and a backup intended recipient system;

a primary intended recipient system, connected to the data bus, configured to repeatedly and sequentially broadcast a primary indicator signal over the data bus independently of the receipt of the attributable security interest messages, the primary indicator signal comprising an identification of the primary intended recipient system that is broadcasting the signal; and a backup intended recipient system connected to the data bus;

wherein the broadcast server further:

receives, from the data bus, the primary indicator signal broadcast by the primary intended recipient system; and determines that the primary intended recipient system is offline whenever the primary indicator signal is not received from the primary intended recipient system for a defined failure period.

22. The system of claim 21 wherein the defined failure period is a defined period of time.

23. The system of claim 21 wherein the defined failure period is a defined number of non-received indicator signals.

24. The system of claim 21 wherein the broadcast server:

redirects, in response to the determination that the primary intended recipient system is offline, subsequent attributable security interest messages from the primary intended recipient system to the backup intended recipient system; and transmits subsequent attributable security interest messages to the backup intended recipient system.

25. The system of claim 24 wherein the broadcast server:

determines, in response to the redirection of subsequent attributable security interest messages to the backup intended recipient system, which of the attributable security interest messages transmitted by the message transmission process were received by the backup intended recipient system; and retransmits those messages that were not received by the backup intended recipient system.

26. A computer implemented method comprising:

transmitting attributable security interest messages, over a network, to a primary intended recipient system;

repeatedly and sequentially broadcasting, over the network, an indicator signal generated by the primary intended recipient system independently of the receipt of the attributable security interest messages, the indicator signal comprising an identification of the primary intended recipient system that is broadcasting the signal;

receiving, from the network, the indicator signal broadcast by the primary intended recipient system; and determining that the primary intended recipient system is offline whenever the indicator signal is not received from the primary intended recipient system for a defined failure period.

27. The method of claim 26 wherein the defined failure period is a defined period of time.

28. The method of claim 26 wherein the defined failure period is a defined number of non-received indicator signals.

29. The method of claim 26 wherein transmitting attributable security interest messages comprises storing the attributable security interest messages transmitted during a defined transmission period.

30. The method of claim 29 wherein the defined transmission period is a trading day.

31. The method of claim 29 wherein transmitting attributable security interest messages includes organizing and assigning a unique identifier to each of the attributable security interest messages that were stored.

32. The method of claim 26 further comprising effectuating the redirection of subsequent attributable security interest messages from the primary intended recipient system to a backup intended recipient system if it is determined that the primary intended recipient system is offline.

33. The method of claim 32 further comprising repeatedly and sequentially broadcasting a backup indicator signal over the network independently of the receipt of the attributable security interest messages if the subsequent attributable security interest messages are redirected to the backup intended recipient system.

34. The method of claim 32 further comprising determining which of the transmitted attributable security interest messages were received by the backup intended recipient system, wherein those messages that were not received by the backup intended recipient system are retransmitted.

35. A computer program product residing on a computer readable medium having a plurality of instructions stored thereon which, when executed by a processor, cause the processor to:
  transmit attributable security interest messages, over a network, to a primary intended recipient system;
  repeatedly and sequentially broadcast, over the network, an indicator signal generated by the primary intended recipient system independently of the receipt of the attributable security interest messages, the indicator signal comprising an identification of the primary intended recipient system that is broadcasting the signal;
  receive, from the network, the indicator signal generated by the primary intended recipient system; and
  determine that the primary intended recipient system is offline whenever the indicator signal is not received from the primary intended recipient system for a defined failure period.

36. The computer program product of claim 35 further comprising instructions to redirect subsequent attributable security interest messages from the primary intended recipient system to a backup intended recipient system if it is determined that the primary intended recipient system is offline.

37. The computer program product of claim 36 further comprising instructions to repeatedly and sequentially broadcasting a backup indicator signal over the network independently of the receipt of the attributable security interest messages if the subsequent attributable security interest messages are redirected to the backup intended recipient system, the backup indicator signal comprising an identification of the backup intended recipient system that is broadcasting the signal.

38. The computer program product of claim 36 further comprising instructions to:
  determine which of the transmitted attributable security interest messages were received by the backup intended recipient system; and
  retransmit those messages that were not received by the backup intended recipient system.

* * * * *